Patented May 17, 1932

1,858,741

UNITED STATES PATENT OFFICE

FRITZ JOST, OF HERNE-BORNIG, GERMANY, ASSIGNOR TO PATENTVERWERTUNGS A. G. "ALPINA," S. A. POUR L'EXPLOITATION DE BREVETS "ALPINA," PATENTS EXPLOITATION CY. "ALPINA," LTD., OF BASEL, SWITZERLAND

CATALYZER

No Drawing. Original application filed July 31, 1930, Serial No. 472,203, and in Germany August 3, 1929. Divided and this application filed August 12, 1931. Serial No. 556,713.

My invention refers to the oxidation of ammonia and more especially to a new catalyzer for use in this process.

In this process platinum wire gauze or a gauze made of platinum alloys has been used, this gauze being formed with very narrow meshes, the yield obtained being about 90–93%.

In the practice of this process a mixture of ammonia and air or oxygen containing gas is conducted through the platinum wire gauze at ordinary pressure and at a temperature varying between 650 and 800° C.

I have now found that I can considerably increase the yield, if I use platinum wire gauze which has been subjected to a mechanical treatment, for instance by pressing, forging or rolling.

If the gauze is for instance placed in a hydraulic press and subjected therein during one half minute to a pressure of about 50 atms. per 100 square centimetres, its activity will be greatly increased and, if used in the process above mentioned, the yield of nitrogen oxide will rise to about 97%.

Instead of platinum the alloys of platinum can be used. The term "platinum" used in the claim is meant to include the alloys.

Example

A mixture of ammonia gas and air containing about 9% by volume ammonia was carefully deprived of all dust particles and was then conducted in contact with a platinum wire gauze, which had previously been subjected during about one half minute to a mechanical pressure of 50 atms. per 100 square centimetres. The number of meshes per square centimetre was 1024, the platinum gauze employed weighed 10 grams, the velocity of flow of the gas mixture was 80–85 liters per minute, the temperature of the gauze varied between 670 and 720° C. 97% of the ammonia was converted into oxides of nitrogen.

Various changes may be made in the details disclosed in the foregoing specification without departing from the invention or sacrificing the advantages thereof.

This application is a division of application #472,203, filed July 31, 1930.

I claim:—

A catalyzer for oxidizing ammonia consisting of platinum gauze densified by mechanical pressure.

In testimony whereof I affix my signature.

FRITZ JOST.